March 5, 1968   H. L. WALKER   3,371,368
WINDSHIELD WIPER
Filed May 24, 1965   2 Sheets-Sheet 1
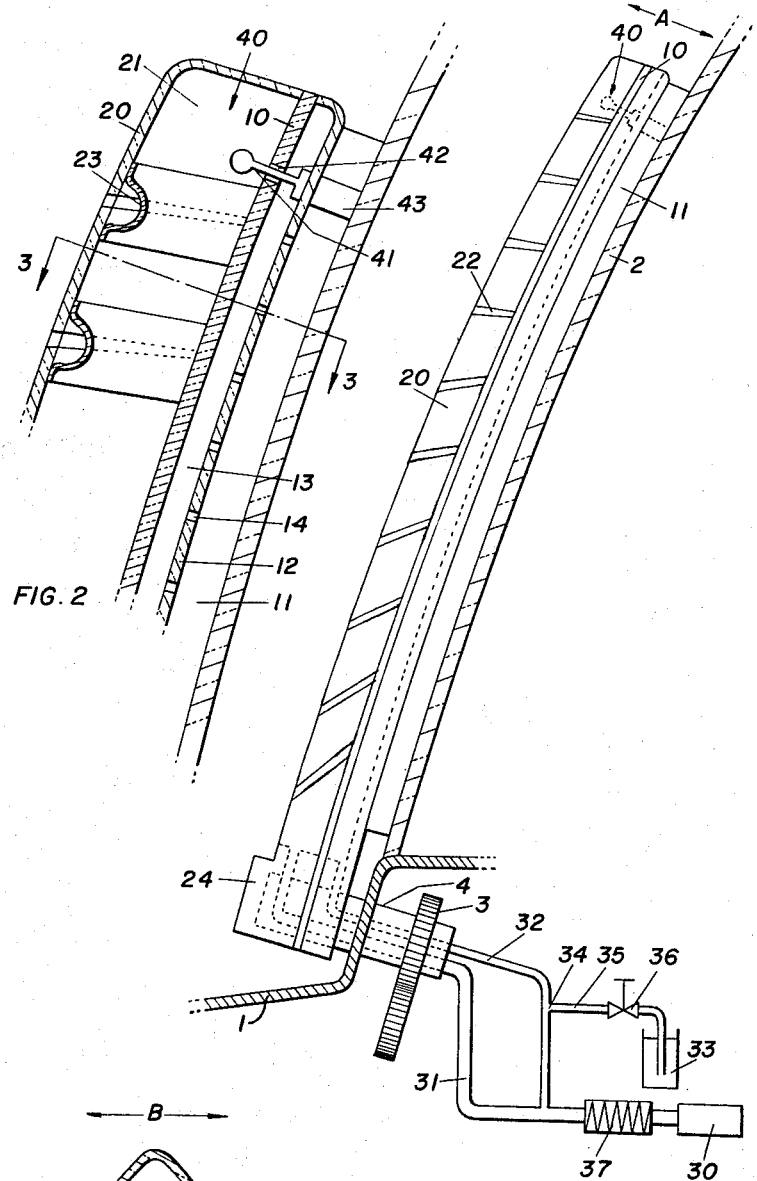
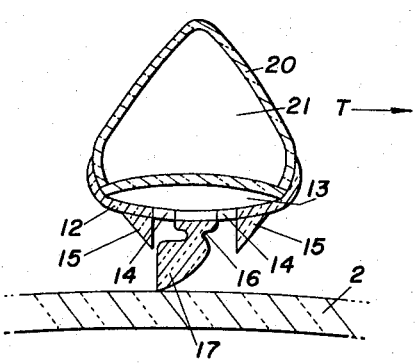
INVENTOR:
HAROLD LLOYD WALKER
BY: *Cavanagh & Norman*

March 5, 1968
H. L. WALKER
3,371,368
WINDSHIELD WIPER
Filed May 24, 1965
2 Sheets-Sheet 2
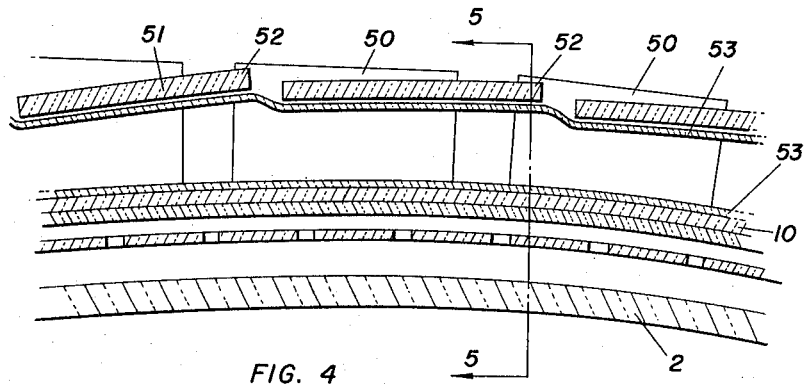
FIG. 4
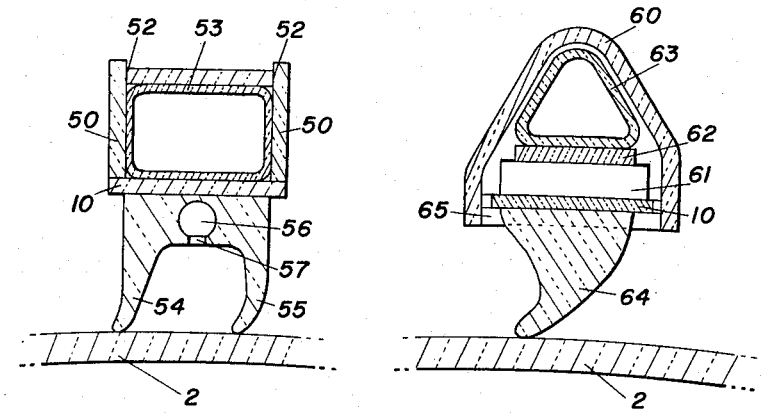
FIG. 5
FIG. 7
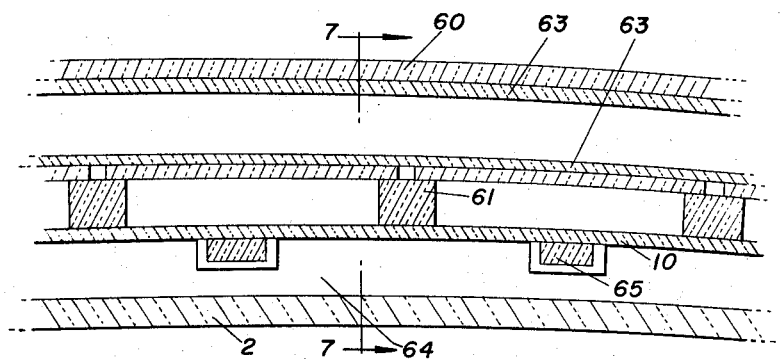
FIG. 6
INVENTOR:
HAROLD LLOYD WALKER
BY: *Cavanagh & Norman*

United States Patent Office 3,371,368
Patented Mar. 5, 1968

3,371,368
WINDSHIELD WIPER
Harold Lloyd Walker, P.O. Box 185,
Finch, Ontario, Canada
Filed May 24, 1965, Ser. No. 457,981
5 Claims. (Cl. 15—250.04)

ABSTRACT OF THE DISCLOSURE

This specification discloses a windshield wiper comprising a blade, a blade support that is inflexible in the direction of blade travel but flexible in a direction normal to blade travel, a drive connected to the support for causing reciprocating travel of the blade over a windshield, structure carried by the blade support and providing a gas impervious cavity; and means to introduce gas under pressure into said cavity to flex said blade support and cause said blade to conform to a windshield.

---

This invention relates to windshield wipers. More particularly, this invention relates to a novel windshield wiper which is adapted to conform to the curvature of a curved vehicle windshield.

In general, vehicle windshield wipers in commercial use today have a rubber blade within a metal blade holder, which is attached by a hook linkage to an oscillating arm which connects with the windshield wiper motor shaft at the vehicle hood. The wiper blades are kept against the windshield by the pressure of the oscillating arm, which is provided with a spring urging it towards the windshield. Such windshield wipers are not very satisfactory, especially with modern curved vehicle windshields, as the wiper blade tends not to conform to the curved portion of the windshield, resulting in streaking. Also, present day windshield wipers are not very efficient in removing snow and ice from windshields.

Accordingly it is an object of the present invention to provide a windshield wiper which conforms to the shape of a vehicle windshield.

It is another object of the present invention to provide a windshield wiper which is substantially transparent, and therefore distracts the vehicle driver's attention to a lesser extent than does a conventional windshield wiper.

It is another object of the invention to provide a windshield wiper which is pneumatically urged against the windshield.

It is another object of the invention to provide a windshield wiper which is adapted to apply cleaning and/or heating fluid to a vehicle windshield.

It is another object of the invention to provide a windshield wiper which does not become coated with ice during winter driving conditions.

Other objects will become evident from the disclosure to follow.

Accordingly, the novel wiper assembly for a vehicle windshield comprises a blade adapted to travel over and clean said windshield; a blade support member adapted to support said blade and being substantially inflexible in the direction of travel of said blade but flexible in a direction normal to the direction of travel of said blade; means to move said blade over said windshield; means positioned upon said blade support member to define an elongated cavity, said elongated cavity being constructed so that gaseous fluid at a pressure in excess of the pressure of the external atmosphere can be maintained therein; means for introducing gaseous fluid under pressure into said elongated cavity under pressure; and means to cause flexing of said blade support member and said blade towards said windshield upon maintenance of a pressure of gaseous fluid in excess of the pressure of the external atmosphere in said elongated cavity.

The invention will be described more particularly with reference to the accompanying drawings, in which:

FIGURE 1 is a side view of one embodiment of the novel windshield wiper, together with a schematic diagram of a preferred air supply system.

FIGURE 2 is an enlarged longitudinal sectional view of the tip of the windshield wiper shown in FIGURE 1.

FIGURE 3 is a transverse sectional view taken along the line 3—3 of FIGURE 2.

FIGURE 4 is a fragmentary longitudinal sectional view of a second embodiment of the invention.

FIGURE 5 is a transverse sectional view of FIGURE 4 taken along the line 5—5.

FIGURE 6 is a fragmentary longitudinal sectional view of a third embodiment of the inventive windshield wiper.

FIGURE 7 is a transverse sectional view taken along line 7—7 of FIGURE 6.

Referring now to FIGURES 1, 2 and 3, a portion of a vehicle body 1 and the attached vehicle windshield 2 are shown in section. A system of gears 3 connected to a conventional windshield wiper motor (not shown) drives a shaft 4 which passes through to the exterior of the vehicle body 1 and is formed for attachment of the windshield wiper.

The novel windshield wiper shown in this embodiment comprises a blade support member 10 which is flexible in the direction indicated as A in FIGURE 1 but is not flexible in the direction indicated as B in FIGURE 3. This blade support member is preferably made from clear plastic.

Between the blade support member 10 and the windshield 2 is positioned a wiper blade 11, which can suitably be a conventional windshield wiper blade which is attached either permanently or removably to the blade support member 10. In the embodiment shown here, however, the windshield wiping blade 11 is made from transparent, flexible plastic and is connected to the blade support member 10 by a flexible plastic connecting piece 12 which defines an air space 13 with the blade support member. The connecting piece 12 is also provided with a number of holes 14 on either side of the blade 11, for purposes which will be more fully explained later.

On the side of the blade support member 10 opposite to the blade 11 is positioned a series of members 20 which define with the blade support member 10 an elongated cavity 21. These members 20 are separated from one another by a series of slits 22 which extend substantially to the level of the support member 10. The length of the members 20 and the angle made by the slits 22 relative to the member 10 can vary along the length of the wiper assembly. Preferably the entire assembly is constructed so that it tapers from the shaft 4 to the distal end of the wiper.

In the areas of the slits 22, a thin membrane 23 is provided to join adjacent pieces 20 in air tight relationship. This membrane 23 can be made from elastic material or can be inelastic, if sufficient slack is provided so that the slits 22 are enabled to become wider. If the members 20 are made from a suitable plastic, the membranes 23 can be thinned portions formed integrally with the members 20.

The bottoms of the members 20, which attach to the member 10, can be either straight or with some degree of curvature. Preferably, these bottoms are made with a slight degree of curvature, less than that occurring in the windshield with which the wiper is designed to be used. These members 20 are attached rigidly to the member 10, and thus what ever degree of curvature is present in the bottom of the members 20 is also present in member 10.

At the shaft end of the windshield wiper, a plastic block 24 is preferably provided for fitting over and mating with the shaft 4, and for transmitting motion from that shaft to the support member 10 and its associated structure.

A source of air under pressure is provided within the vehicle for use with the windshield wiper according to the invention. In FIGURE 1, this source of air is shown diagrammatically at 30. It can be an existing compressed air supply for air brakes or defrosting, or can be supplied by a small diaphragm pump, a staged fan compressor, or any other desired means. It is also possible and preferred to heat this air supply, as for example with an electric element 37. The air supply is passed into the cavity 21 through suitable tubing here shown as 31. In the embodiment illustrated, the tubing 31 passes upwardly through the shaft 4 and the block 24, but it is understood that it could also pass through the vehicle body 1 separately, and enter the cavity 21 at a point along its length.

In the particular embodiment shown, although not necessarily, a separate air supply tube 32 also passes from the supply 30 of compressed air. This tube 32 also passes upwardly through the shaft 4, and ends in the cavity 13 between the blade 11 and the blade support member 10. The tubing 32 is of smaller diameter than the tubing 31, so that the pressure drop along its length is greater. It is also possible to provide a junction 34 such as a syphon-T in the tube 32, so that windshield washer solvent or water can be introduced into the tube 32 from a vessel 33 by suction through an auxiliary line 35. The passage of fluid through the line 35 is controlled by a button valve 36.

The operation of the device according ot the invention is as follows. A supply of air at a convenient pressure, for example 3 to 25 p.s.i.g., is supplied by the air supply means indicated as 30. This air is passed through line 31 until it eventually reaches cavity 21. As this cavity is relatively air tight, the pressurized air cannot escape and exerts a force against the cavity walls, i.e. the member 10 and the members 20. As the slits 22 are capable of expanding and the member 10 is flexible, this force will cause a lifting of the end of each member 20 which is closest to the shaft 4, and the amount of this lifting for any given pressure will depend upon the angle which the slit 22 at that end of the member 20 makes with the member 10. The membranes 23 will prevent air from escaping through the slits 22.

It will be obvious from consideration of the forces involved that, as a result of the lifting of one end only of each member 20, the member 10 will be flexed toward the windshield 2. This effect will be more pronounced in those places where the slits 22 form a large angle to the normal relative to member 10 than in those places where the slits form a small angle to the normal to that member. In this way, by varying the angle at which the slits are cut and the number of slits per unit of length, the degree of bending of the member 10 towards the windshield can be controlled.

In the embodiment shown, air also passes through the line 32 into the cavity 13. Because of the pressure drop in line 32, this air reaches the cavity 13 at a lower pressure than the air in cavity 21. Additionally, this air escapes to the atmosphere along the length of cavity 13 through the holes 14. The pressure of the pressurized air in cavity 13 thus does not have any appreciable effect in flexing the member 10 away from the windshield. However, this air provides a cushion effect between the wiper 11 and the member 10, and ensures that the wiper 11 remains in tight contact with the windshield along its length. Additionally, this air is applied to the windshield through the holes 14. It will be thus appreciated that, if the air is heated as is desirable, it will have an extremely useful function in de-icing the windshield. When the valve 36 is depressed, windshield washer solvent or water from the receptacle 33 is entrained in the air passing into cavity 13, and is introduced with that air to the windshield, thus filling a windshield cleaning function.

If desired, air flow directors 15 can be provided on the flexible member 12 to direct the flow of air passing through the hole 14. In FIGURE 3 for example, the wiper is passing over the windshield in the direction designated as T. The wiper blade 11 is somewhat deformed by its passage and this blade and the deflector members 15 cooperate to ensure that substantially all the air passing from the cavity 13 passes through the holes in advance of the wiper in its direction of travel, rather than through the holes behind the wiper. In this way, the air and any entrained water or solvent is passed to the area where it will be most useful in cleaning, heating, or de-icing the windshield. Preferably the wiper blade has the cross-section shown, with a thinned portion 16 and a bulging portion 17, which is adapted to cooperate with members 15.

In wipers embodying the invention, it is found that there is occasionally a tendency for certain portions of the wiper blade to lift from the windshield, particularly while the vehicle is proceeding at high speed. This tendency can be counter-acted by increasing the air pressure in the cavity 21. So that the increased air pressure will not cause the wiper to press at other times so tightly against the windshield that considerable friction will be caused, it is preferred to provide one or more small valves at points where such lifting off is found to occur. This valve functions to bleed the additional air pressure from the cavity 21 when the blade is contacting the windshield, while allowing the full pressure to build up in cavity 21 when the blade tends to leave the windshield. If two or more valves are used, it is preferred to divide the cavity 21 into several separate cavities, one for each of the valves, each being supplied with air by a separate line 31. A suitable form of such valve is indicated generally at 40 in FIGURES 1 and 2. It comprises a valve member 41 which suitably passes through a hole 42 in the blade support member 10. The valve member 41 contacts at its lower portion a relatively inflexible portion 43 of the wiper blade 11. The valve member 41 is expanded at both of its ends so that it will not pass completely through the hole 42. The upper end is also formed suitably so that air pressure acting upon it will act to urge it in a downward direction. In practice, it is found that a spherical shape for the upper portion works quite satisfactorily.

The operation of the valve 40 is as follows: When the wiper blade is making contact with the windshield, pressure is transmitted from the windshield through the relatively inflexible section of the blade 43 to the valve member 41. This causes the upper portion of the valve member 41 to move away from the hole 42, so that air can escape through the hole 42 and therefore reduce the pressure in the cavity 21. However, when the blade tends to leave the windshield, the air pressure on the top of the valve member 41 will cause the expanded top portion to move downward, thus sealing the hole 42, and increasing the air pressure in the cavity 21 and hence the degree of curvature imparted to the member 10.

It will be appreciated that, using increased air pressure and a valve in this way, quite considerable curvatures can be imparted to the member 10 if the blade leaves the windshield. In experimentation, curvatures of up to 90° have been obtained. In order to prevent the breaking of the member 10 as a result of too great curvature, the membranes 23 should be made of extremely tough material, and if elastic, should have only a limited amount of elasticity. Alternately, if it is not desired to use tough material for the membranes, it is possible to have adjacent members 20 interlinked so that they cannot separate beyond a certain permitted amount.

It will be understood that all parts of the novel windshield wiper can be made from transparent plastic if desired, and that windshield wiper made in such a way will be a lesser distraction to the driver of the vehicle than would a conventional windshield wiper.

In FIGURES 4 and 5, a second embodiment of the novel windshield wiper according to the invention is shown. In this embodiment, the blade support member 10 is provided with a series of short, substantially rigid, side wall sections 50, which are arranged in pairs. The pairs of side walls 50 are bridged by roofing members 51, which are rigidly secured to the side wall members at the point marked 52, but are not secured to the side wall members at any other point along their length. An inflatable member 53, which can for example be an elongated balloon but which is preferably formed of thin polyethylene tubing, is placed within the cavity formed by the members 50, 51 and 10.

The operation of this embodiment of the invention is quite similar to that of the embodiment shown in FIGURES 1–3. When air under pressure is introduced into the inflatable member 53, the inflatable member tends to expand, and thus applies force on members 10, 50 and 51. This causes the members 51 to lift upwardly, and the motion from such lifting is transmitted to member 50 and thence to member 10, causing curvature of the member 10 toward the windshield, and thus curvature of the blade supported by the member 10.

The blade used with this embodiment can of course be similar to that described in FIGURES 1–3. However, it may be advisable in some circumstances to use a double blade as shown in FIGURES 4 and 5. This blade comprises two wiping portions 54 and 55 and a central cavity 56 provided with holes 57 through which air or a mixture of air and water or windshield cleaning solvent can be introduced to the windshield. This type of wiper blade can also be used of course with the wiper shown in FIGURES 1–3, in lieu of the blade 11 and connecting member 12.

In FIGURES 6 and 7, a third embodiment of a novel windshield wiper is shown. In this embodiment, a blade support member 10 is inserted within with a roofing member 60, which is elastic and which is secured to a number of members 65 upon which member 10 rests. Contained within the cavity formed by the members 10 and 60 are a series of substantially incompressable supports 61, upon which substantially rigid members 62 are mounted, suitably by gluing. An inflatable member 63, which, like member 53 described above, can be a conventional balloon, a cylinder formed of polyethylene film, or the like, is positioned above the members 62.

The operation of this embodiment of the invention differs slightly from that of the embodiments described previously. When the member 63 is inflated, it exerts force on members 60 and 62. As the members 62 are rigid and the member 60 is elastic, the force tends to move member 60 upwards, hence moving members 65 upwards. At the same time, members 61 are pressed towards the windshield 2. As the blade support member 10 is flexible, it and its supported blade will bend as a result of the forces transmitted to them by members 61 and 65. The curvature imparted to the blade in this way will cause it to lie closely against the windshield. The spacing of members 61 and 65 along the upper length can of course be varied as desired, so that the curvature imparted to member 10 along its length can be varied.

The windshield wiper blade 64 illustrated in FIGURES 6 and 7 is a conventional form of blade, which is shown as being secured to the blade support member 10. It would of course be possible to use either of the blades shown and described in the previous figures, or a conventional blade which would be detachable from the blade support member 10 in known manner, or any other type of blade desired. If a conventional blade with no means for supplying air to the windshield surface is used, the tubing 32 shown in FIGURE 1 is of course unnecessary, and it can be omitted.

It is of course possible to use a valve, for example one such as described with reference to FIGURES 1 and 2, with the embodiments described in FIGURES 4–7 as well. Such a valve would normally be resorted to if the wiper blade of these embodiments shows a tendency to lift from the windshield.

Although the embodiments described above are preferably made from transparent plastic material, it is understood that they can be made from any other suitable material, such as for example metal. Such materials can be used advantageously in cases where durability is extremely important and an opaque wiper would not restrict the vehicle driver's vision to any great extent. Thus for example, the pieces 20 can be replaced in the embodiment shown in FIGURES 1–3 by bands of metal or by hoop-shaped pieces of wire cemented to the member 10 so as to provide slits 22 between them which are at desired angles to member 10. If such a construction is used, it is preferred to use inflatable member within the cavity 21 and to omit the membranes 23. The member 10 can of course be a spring steel strip or the like.

Many other modifications are also possible in the particular embodiments shown here. For example, air can be introduced to the windshield for cleaning purposes by providing tiny holes at intervals along the length of the cavity 21 or inflatable member 53 or 63 and corresponding holes in the blade support member 10. Such holes must of course be small enough so that the air escaping from them is not sufficient to reduce the air pressure inside the cavity or inflatable member to such an extent that the wiper blade leaves the windshield. With this construction it is possible to introduce water or solvent to the windshield by passing it into the inflatable member and allowing it to escape through the tiny holes referred to above.

The foregoing is a description of a preferred embodiment of the invention by way of example only and the invention is not limited to the specific features shown but contemplates all such variations as come within the spirit of the invention as defined by the following claims.

What is claimed is:

1. A windshield wiper for use with a vehicle windshield, which wiper comprises: a blade adapted to travel over and clean said windshield; a blade support member adapted to support said blade and being substantially inflexible in the direction of travel of said blade but flexible in a direction normal to the direction of travel of said blade; means to move said blade over said windshield; means positioned upon said blade support member to define an elongated cavity, said elongated cavity being constructed so that gaseous fluid at a pressure in excess of the pressure of the external atmosphere can be maintained therein; means for introducing gaseous fluid under pressure into said elongated cavity under pressure; and means to cause flexing of said blade support member and said blade towards said windshield upon maintenance of a pressure of gaseous fluid in excess of the pressure of the external atmosphere in said elongated cavity, said means to cause flexing of said blade support member and said blade comprises a plurality of segments, each of said segments having two sides and a roof portion, each of said segments being rigidly attached along the bottom edges of said sides adjacent one end thereof to said blade support member, and being adapted to have upward force exerted by said gaseous fluid under pressure against said roof portion adjacent the end remote from said first end, whereby said first end and the portion of said blade support member attached thereto are urged in a direction opposite to said upward force.

2. A windshield wiper as claimed in claim 1, in which adjacent segments are joined together by gas-tight flexible connections, and said upward force is exerted directly on said individual segments by pressure of gaseous fluid.

3. A windshield wiper as claimed in claim 1 in which said means positioned upon said blade support member to define an elongated cavity comprises an elongated inflatable member, and said upward force is exerted on said individual segments by pressure of gaseous fluid within said inflatable member.

4. A windshield wiper as claimed in claim 1, additionally comprising a valve linking said elongated cavity with the external atmosphere, said valve being operative to permit the escape of gaseous fluid from said cavity to the atmosphere when said blade contacts said windshield, and to impede the escape of said gaseous fluid to the atmosphere when said blade does not contact said windshield.

5. A windshield wiper for use with a vehicle windshield, which wiper comprises: a blade adapted to travel over and clean said windshield; a blade support member adapted to support said blade and being substantially inflexible in the direction of travel of said blade but flexible in a direction normal to the direction of travel of said blade; means to move said blade over said windshield; means positioned upon said blade support member to define an elongated cavity, said elongated cavity being constructed to that gaseous fluid at a pressure in excess of the pressure of the external atmosphere can be maintained therein; means for introducing gaseous fluid under pressure into said elongated cavity under pressure; and means to cause flexing of said blade support member and said blade towards said windshield upon maintenance of a pressure of gaseous fluid in excess of the pressure of the external atmosphere in said elongated cavity, said blade support member being connected to said blade by at least one flexible connective member defining a cavity between said blade and said blade support member; and said flexible connective member is provided with a plurality of holes through which fluid is adapted to be passed from said cavity to the surface of said windshield.

References Cited

UNITED STATES PATENTS

| | | | |
|---|---|---|---|
| 2,069,699 | 2/1937 | Dohler | 15—250.04 |
| 3,058,141 | 10/1962 | Christen | 15—250.36 |
| 3,304,569 | 2/1967 | Christensen | 15—250.04 |

FOREIGN PATENTS 836,892  4/1952  Germany.

CHARLES A. WILLMUTH, *Primary Examiner.*